Aug. 9, 1932.   S. B. HASELTINE   1,871,368
FRICTION SHOCK ABSORBING MECHANISM
Original Filed Aug. 2, 1923   2 Sheets-Sheet 2
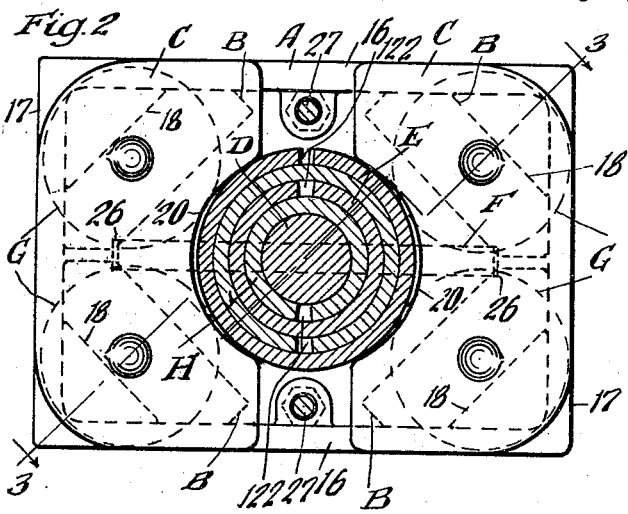
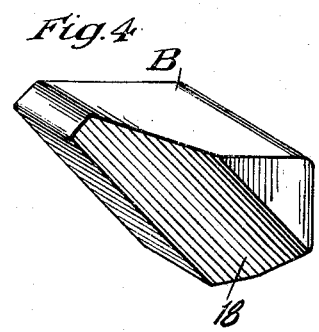
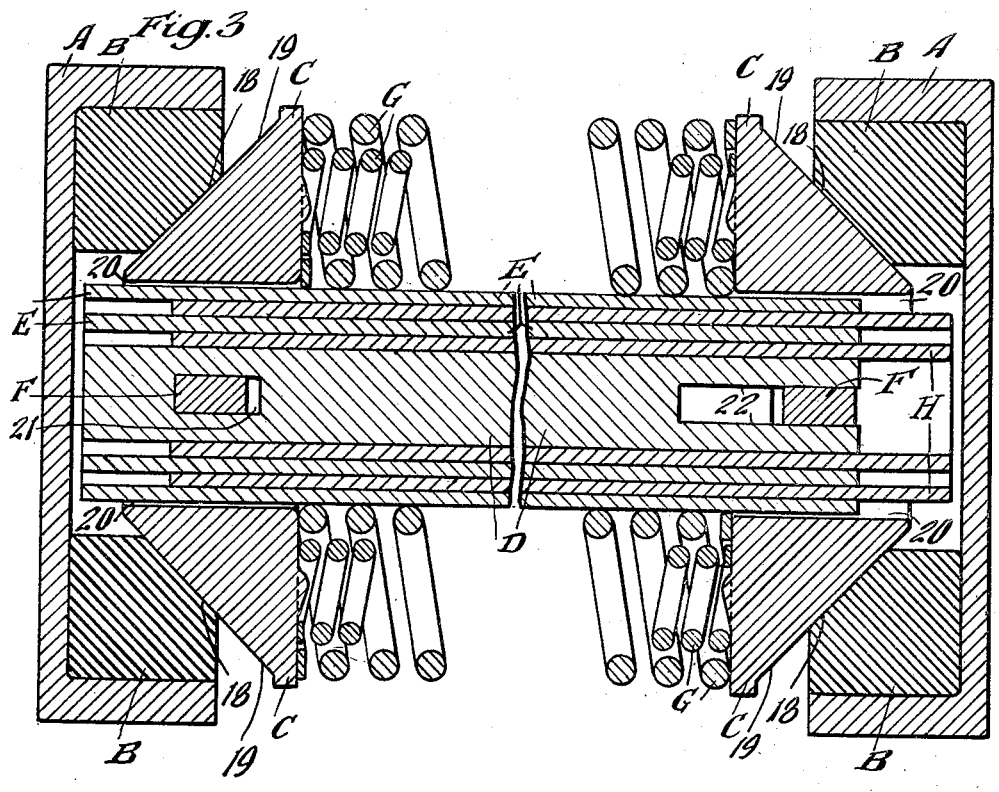
Inventor
Stacy B. Haseltine
By Joseph Harris
His Atty.
Witness
Wm. Geiger Patented Aug. 9, 1932

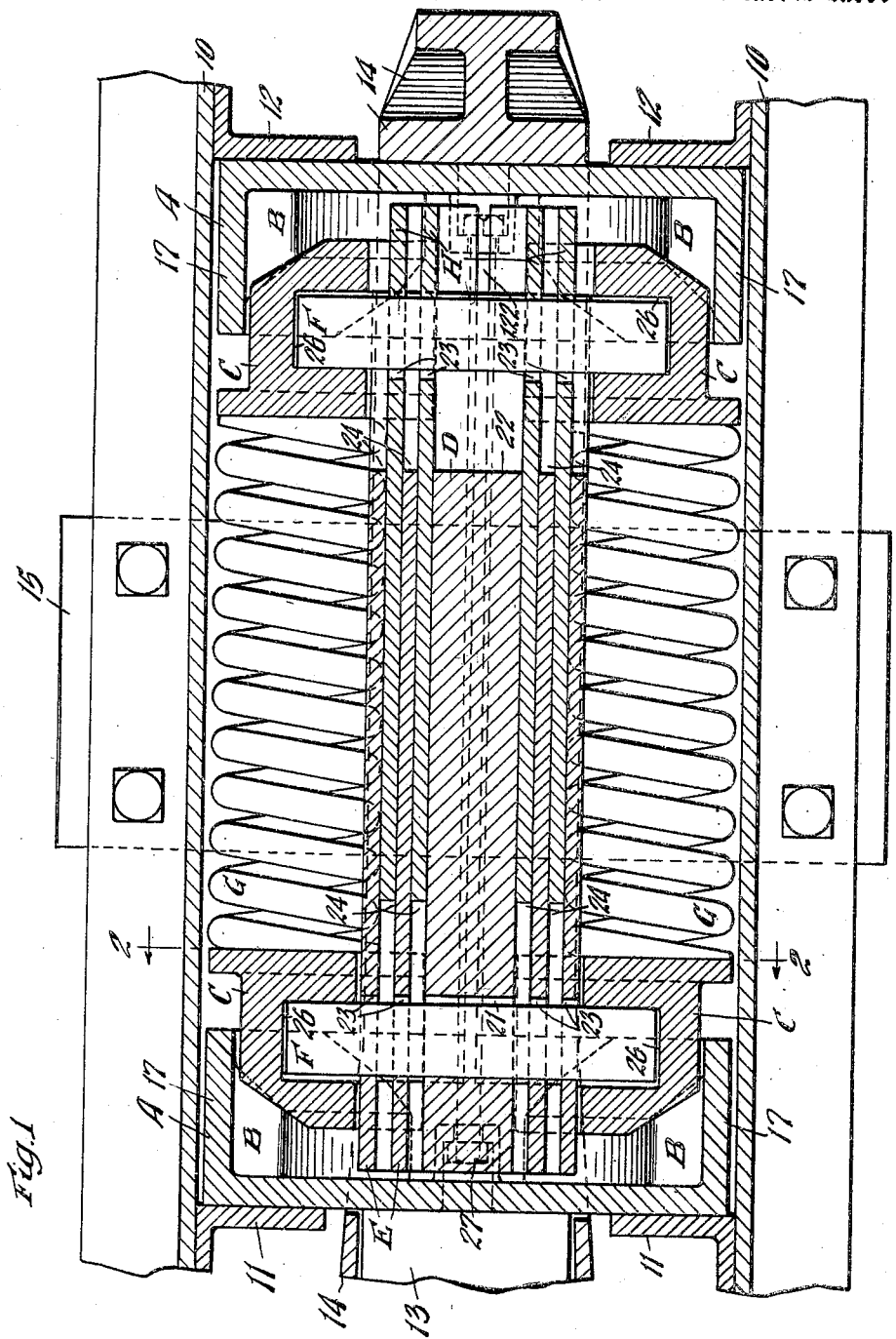

1,871,368

UNITED STATES PATENT OFFICE

STACY B. HASELTINE, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Original application filed August 2, 1923, Serial No. 655,223. Divided and this application filed June 6, 1928. Serial No. 283,203.

This invention relates to improvements in friction shock absorbing mechanisms.

This application is a division of applicant's co-pending application for friction shock absorbing mechanisms, Serial No. 655,223, filed August 2, 1923.

One object of the invention is to provide a friction shock absorbing mechanism, especially adapted for railway draft riggings, comprising friction means including a plurality of intercalated friction elements which are moved longitudinally with respect to each other to create friction therebetween to afford resistance of high capacity, together with means for placing the friction means under lateral pressure, wherein the pressure between the elements composing the friction means is equalized by providing curved, cooperating surfaces on certain of the elements.

Another object of the invention is to provide a friction shock absorbing mechanism of the character indicated, including a column element, a plurality of relatively movable friction elements cooperating with the column element, wherein the cooperating friction surfaces of the column and the adjacent element are curved to permit automatic adjustment of the parts, together with means for pressing the friction elements against each other and against the friction surface of the column.

A more specific object of the invention is to provide a shock absorbing mechanism including a cylindrical friction post, a plurality of intercalated, tubular, hollow friction elements surrounding the post and having frictional engagement therewith, together with means for effecting relative movement of the friction elements with respect to each other and also relative movement of certain of the friction elements and post, and means for pressing the friction elements into engagement with each other and said post.

Other and further objects of the invention will more clearly appear from the description and claims hereinafter following.

In the drawings, forming a part of this specification. Figure 1 is a horizontal, longitudinal sectional view through a portion of the underframe structure of a railway car, illustrating my improvements in connection therewith. Figure 2 is a vertical, transverse sectional view, corresponding substantially to the line 2—2 of Figure 1, the draft sills being omitted in this view. Figure 3 is a longitudinal, diagonal sectional view, corresponding substantially to the line 3—3 of Figure 2. And Figure 4 is a detailed perspective view of a wedge member, employed in connection with my improved mechanism.

In said drawings, 10—10 indicate the usual channel-shaped center or draft sills of a railway car underframe, to the inner sides of which are secured front stop lugs 11—11 and rear stop lugs 12—12. The inner end portion of the coupler shank is designated by 13, to which is connected a hooded yoke 14 of well known form.

My improved shock absorbing mechanism is disposed within the yoke and the yoke is supported by a detachable saddle plate 15, secured to the bottom flanges of the draft sills.

My improved shock absorbing mechanism comprises, broadly, front and rear followers A—A; front and rear sets of wedge blocks B—B, each set comprising four blocks; a pair of front and a pair of rear friction shoes C—C; a central friction post D; two tubular friction elements E—E and two tubular friction elements H—H; front and rear restoring bars F—F; and a main spring resistance G comprising four spring elements.

The front and rear followers A are of similar construction, each comprising a main plate-like section having inwardly extending, spaced top and bottom flanges 16—16 and vertically disposed, inwardly extending, spaced side flanges 17—17. The plate-like sections of the main followers A cooperate respectively with the front stop lugs 11 and the rear stop lugs 12.

The wedge blocks B, which are eight in number, are arranged in sets at the front and rear end of the mechanism, each set being housed within one of the main followers A. As most clearly shown in Figures 1, 2 and 3, the blocks B are disposed in the corners of the followers A. As will be evident, the wedge blocks are thus arranged in diagonally opposed parts. As most clearly illustrated in Figure 4, each wedge block B is provided with an inner wedge face 18 disposed angularly with reference to the longitudinal, vertical and transverse horizontal axes of the mechanism. The wedge blocks B are provided with flat side and end faces which fit within the corners of the followers A.

The friction shoes C, which are four in number, are arranged in pairs at opposite ends of the mechanism. Each friction shoe is provided with a pair of wedge faces 19 disposed at the top and bottom thereof and cooperating respectively with the wedge faces 18 of the two wedge blocks at the same side of the mechanism. On the inner side, each friction shoe C is provided with a curved, longitudinally extending friction surface 20 which cooperates with the outermost of the tubular friction elements E, as hereinafter more clearly pointed out. At the inner end, each shoe presents a transversely disposed, flat abutment face which bears on the corresponding ends of two of the coils of the main spring resistance G.

The friction post D is in the form of a cylindrical bar, as most clearly illustrated in Figure 2, and is interposed between the front and rear followers and is arranged centrally of the mechanism. The post D is of such a length that the front and rear ends thereof are normally spaced from the front and rear followers A. As shown in Figure 3, the front end of the post D is spaced a short distance from the end wall of the front follower A, while the rear end of the post is spaced a much greater distance from the transverse end wall of the rear follower A. At the forward end, the post D is provided with a transverse opening 21, adapted to accommodate the front restoring bar F. At the rear end, the post is transversely slotted, as indicated at 22, to accommodate the rear restoring bar for sliding movement.

As shown in Figure 3, the opening 21, which accommodates the front restoring bar, is of such a length as to permit a certain amount of relative movement of the post and bar. This clearance is left so as to insure engagement of the post by the front follower during the compression of the mechanism, after the initial action thereof. The slot 22 at the rear end of the post is of such a length as to permit engagement of the post at both ends by the main followers before the restoring bar comes into engagement with the inner end wall of the slot.

The friction elements are four in number and surround the post D. As shown, the friction elements are of cylindrical tubular form and are telescoped with each other so as to provide a plurality of intercalated friction elements. Each of the tubular friction elements E and H is open at one side, as indicated at 122, thereby providing a longitudinal slot. As shown in Figure 2, the longitudinally slotted openings of the tubular friction elements are all arranged in the same vertical plane and alternate elements have the slots thereof arranged at the same side of the post, while adjacent elements have the slots thereof arranged on opposite sides of the post. The tubular friction elements are arranged in groups, one group including elements E—E and the other group the elements H—H, the elements E being alternated with the elements H. The friction elements E have the front ends thereof spaced slightly from the transverse end wall of the front follower A, while the friction elements H have the rear ends thereof spaced slightly from the transverse end wall of the rear follower A.

The tubular elements are of such a length, as clearly shown in Figures 1 and 3, that the rear ends of the elements E are spaced such a distance from the end wall of the rear follower as to permit full compression of the mechanism during operation of the same. The friction elements H are of the same length and have the front ends thereof also spaced a similar distance from the transverse end wall of the front follower A to permit full compression of the mechanism. The post D and the tubular elements E and H preferably are made of the same length, so that when the mechanism is fully compressed the opposite ends of the post and the friction elements will be engaged simultaneously by the front and rear followers A, the post and friction elements thus acting as a solid column to limit the compression of the main spring resistance and transmit the actuating force directly to the stop lugs of the draft sills.

The restoring bars F, which are arranged at the front and rear ends of the mechanism, extend through aligned openings 23—23 in alternate members of the tubular friction elements E, the friction elements H being provided at their front ends with relatively long slots 24—24 which accommodate the retaining bars for movement. The slots 24 are of such a length as to permit full movement of the friction elements during compression of the mechanism. The bar at the front end of the friction post is so arranged as to effect restoration of the post to normal position, the bar extending through the transverse opening 21 provided in the post. At the rear end, the friction elements H are provided with similar openings 23 which accommodate the rear restoring bar, the friction elements E being provided with slots 24 at their rear ends similar to the slots of the friction elements H.

As shown, the openings 23 of the tubular members are of such a size as to permit slight longitudinal displacement of the restoring bars F with respect to said elements. The opening 21 of the post is of substantially the same size as the openings 23, thus permitting a certain amount of relative movement between this bar and the post.

The opposite ends of the front and rear restoring bars F are seated in pockets 26—26 provided in the friction shoes C, the pockets 26 also being of such a size as to permit of a slight relative movement between the restoring bars and the shoes.

As clearly shown in Figure 1, the front restoring bar F normally engages the front end walls of the openings 23 of the tubular elements and has the rear edge thereof abutting the inner end walls of the pockets 26 of the friction shoes at the corresponding end of the mechanism. The rear restoring bar F has the rear edge thereof normally in engagement with the outer end walls of the openings at the rear ends of the friction elements and the front edge thereof bearing on the inner end walls of the pockets 26 of the rear friction shoes C.

The spring resistance G comprises four spring units arranged in pairs at opposite sides of the mechanism. As clearly illustrated in Figures 1, 2, and 3, the two units at each side of the mechanism have their opposite ends bearing respectively on the front and rear friction shoes at the same side of the mechanism.

In order to hold the mechanism assembled and maintain the same of overall uniform length, I employ a pair of retainer bolts 27—27 arranged centrally of the mechanism and disposed above and below the tubular friction elements. As shown, the front and rear followers are provided with pockets for receiving the heads and nuts of the retainer bolts. The retainer bolts, in addition to holding the mechanism assembled, also maintain the spring resistance G under initial compression.

The operation of my improved shock absorbing mechanism, during a buffing stroke, is as follows: The front follower A will be forced inwardly of the mechanism, carrying the front set of friction shoes C therewith, inward movement of the shoes being resisted by the springs G. Due to the wedging action of the engaging wedge faces of the wedge blocks and shoes, the shoes will be forced laterally inwardly against the tubular friction elements E and H, thereby pressing the same into intimate contact and into tight frictional engagement with the friction post D. During the first part of the compression stroke, there will be no appreciable movement of the post and friction elements E, due to the clearance provided between the follower and the front ends of the friction elements E and the post D. When the clearance between the follower and the friction elements and post has been taken up, the post and friction elements E will be engaged by the front follower and moved rearwardly of the mechanism. Due to the friction existing between the post and the friction elements, the friction elements H are carried rearwardly until the rear ends of the same come in engagement with the rear main follower A, whereupon movement of the same will be arrested.

During the remainder of the compression stroke, the friction elements H will be held substantially stationary. As will be evident, the clearance between the restoring bars and the inner end walls of the openings 23 of the friction elements permits of the preliminary action described, without any substantial movement of the post and friction elements. The pressure is transmitted through the spring resistance G to the rear friction shoes C, thereby also setting up a wedging action between these shoes and the wedge blocks B at the rear end of the gear. The friction elements will thus be placed under substantially uniform compression, the lateral inward pressure being applied at both ends of the same. During the remainder of the compression stroke, the friction elements E will slide on the friction elements H and the post will slide on the inner friction element H, thereby greatly augmenting the resistance. The compression of the mechanism will continue either until the actuating force is reduced or until the rear ends of the friction elements E and the rear end of the post engage the transverse end wall of the rear follower A, whereupon relative movement of the followers will be arrested and the pressure will be transmitted directly through the post and friction elements from one follower to the other, thereby preventing undue compression of the spring resistance G, the friction post and friction elements together acting as a solid column load-transmitting member to transmit the force to the stop lugs of the draft sills.

During a draft action, the rear follower will be moved forwardly while the front follower is held stationary, the action during the compression stroke being substantially the same as that described in connection with the buffing stroke, with the exception that the friction post and friction elements E are held stationary upon engaging the transverse end wall of the front follower A, and the friction elements H are moved relatively to the friction post and friction elements E during the further compression of the gear.

During release, when the actuating force is reduced, the expansive action of the spring resistance G will force the friction shoes apart, thereby carrying the restoring bars F outwardly, the bars in turn moving the friction elements E and H apart and also moving the post outwardly until the same and the friction elements are restored to the normal position shown in Figures 1 and 3.

As will be evident, due to the clearance provided between the restoring bars and the front walls of the pockets 26 of the shoes, there will be a slight inward movement of the shoes during compression of the mechanism before the bars are moved inwardly, thereby providing a clearance between the inner edges of the bars and the inner end walls of the pockets 26. Due to this action, the release of the mechanism is greatly facilitated, because during the first part of the restoring operation the shoes C will be forced apart independently of the friction elements. After the clearance has been taken up between the inner end walls of the pockets and the restoring bars, the bars will be forced outwardly, carrying the friction elements and the post to their normal position.

As hereinbefore described and as shown in Figure 2, the friction shoes C have the curved inner surfaces thereof of a radius less than the curvature of the friction surface of the adjacent friction element E. By this arrangement, proper contact between the friction shoes and friction element E is assured, the initial contact before pressure is applied being at the outer edges of the curved face of the friction shoe. When the lateral pressure is applied to the friction shoes, the co-acting curved surfaces of the outer friction element E and the shoes are forced to conform to each other. It will be evident that this prevents line contact between the shoes and tubular friction element, which might result if the co-acting friction surfaces were made of precisely the same curvature.

From the preceding description, taken in connection with the drawings, it will be evident that I have provided a friction shock absorbing mechanism of high capacity, wherein the friction surfaces of the cooperating elements, including the friction shoes, are cylindrical, so that the parts may automatically adjust themselves to assure proper contact between all of the friction surfaces and also proper contact between the wedge faces of the friction shoes and wedge blocks.

While I have herein shown and described what I consider the preferred manner of carrying out my invention, the same is merely illustrative and I contemplate all changes and modifications that come within the scope of the claims appended hereto.

I claim:

1. In a friction shock absorbing mechanism, the combination with a rigid, cylindrical friction post extending lengthwise of the mechanism; of a plurality of intercalated, tubular friction elements of curved cross section, extending lengthwise of the mechanism and embracing the post and having frictional contact therewith, said elements being relatively movable; means for effecting relative movement of said elements; means actuated by said last named means for placing the friction elements under lateral pressure and forcing the same against the post; and a main spring resistance.

2. In a friction shock absorbing mechanism, the combination with a longitudinally disposed rigid friction post; of a plurality of intercalated, relatively movable, tubular friction elements extending lengthwise of the mechanism, surrounding the post and having frictional engagement therewith; means for placing said elements under lateral pressure and forcing the same against the post; a main spring resistance; and means for effecting relative movement of said elements.

3. In a friction shock absorbing mechanism, the combination with a longitudinally disposed cylindrical friction post; of a plurality of intercalated, longitudinally split, tubular friction elements surrounding the post, said elements being relatively movable; means for effecting relative movement of said elements; laterally, inwardly acting wedge means; friction shoes interposed between said wedge means and elements; and a main spring resistance.

4. In a friction shock absorbing mechanism, the combination with a central rigid friction post; of friction shoes at opposite sides of the post; laterally, inwardly acting wedge means cooperating with the shoes; a plurality of intercalated, longitudinally extending, telescoped tubular friction elements interposed between the post and shoes, said shoes and tubular elements having cooperating curved surfaces; and a main spring resistance.

5. A shock absorber comprising two relatively movable followers, a central longitudinal oversolid post arranged between said followers and adapted to be engaged at opposite ends by said followers, two groups of intercalated friction plates arranged on opposite sides of said post and each group consisting of two sets of plates which are movable lengthwise relatively to one another, said sets of plates adapted to be engaged at their outer ends with said followers, respectively, shoes engaging with the outermost friction plates, said post having its opposite sides curved crosswise, said shoes having their inner sides curved crosswise and said friction plates being of curved form in cross section and having their mating sides engaging with each other and with the curved surfaces of said post and shoes, means for pressing said shoes laterally, means for moving said plates lengthwise, and a spring resistance.

6. A shock absorber comprising a central longitudinal oversolid post, groups of intercalated friction plates arranged on opposite sides of said post, means for moving said plates lengthwise relatively to each other, means for laterally pressing said plates and post together and releasing the same including shoes engaging the outer sides of said groups of plates, the cooperating surfaces of plates, post and shoes being of non-flat form; and spring resistance means disposed lengthwise of the mechanism and opposing relative movement of the plates.

7. A shock absorber comprising a central longitudinal oversolid post, groups of intercalated friction plates arranged on opposite sides of said post, means for moving said plates lengthwise relatively to each other, means for laterally pressing said plates and post together and releasing the same, including shoes engaging the outer sides of said groups of plates, the cooperating surfaces of plates, post and shoes being of non-flat form, and a spring resistance.

In witness that I claim the foregoing I have hereunto subscribed my name this 4th day of June, 1928.

STACY B. HASELTINE.